(12) United States Patent
Shang et al.

(10) Patent No.: US 10,063,512 B2
(45) Date of Patent: Aug. 28, 2018

(54) METHOD AND APPARATUS FOR REALIZING COMMUNITY FEDERATION

(75) Inventors: Guoqiang Shang, Shenzhen (CN); Jun Chen, Shenzhen (CN); Yan Lu, Shenzhen (CN); Lizhe Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 259 days.

(21) Appl. No.: 13/635,080

(22) PCT Filed: Nov. 23, 2011

(86) PCT No.: PCT/CN2011/082753
§ 371 (c)(1),
(2), (4) Date: Sep. 14, 2012

(87) PCT Pub. No.: WO2012/151944
PCT Pub. Date: Nov. 15, 2012

(65) Prior Publication Data
US 2014/0122616 A1    May 1, 2014

(30) Foreign Application Priority Data
Jul. 12, 2011 (CN) .......................... 2011 1 0194077

(51) Int. Cl.
*H04L 12/58* (2006.01)
(52) U.S. Cl.
CPC .............. *H04L 51/32* (2013.01); *H04L 51/24* (2013.01)
(58) Field of Classification Search
CPC ... G06Q 10/107; H04L 12/585; H04L 12/581; H04L 12/58
See application file for complete search history.

(56) References Cited

U.S. PATENT DOCUMENTS

| 7,730,030 B1 | 6/2010 | Xu |
| 2004/0002878 A1 | 1/2004 | Maria Hinton |

(Continued)

FOREIGN PATENT DOCUMENTS

| CN | 101116051 | 1/2008 |
| CN | 101458710 | 6/2009 |

(Continued)

OTHER PUBLICATIONS

Supplemenentary European Search Report for EP11861325.6, Completed by the European Patent Office, dated Apr. 3, 2014, 3 Pages.

(Continued)

*Primary Examiner* — Vivek Srivastava
*Assistant Examiner* — Hien Doan
(74) *Attorney, Agent, or Firm* — Plumsea Law Group, LLC

(57) ABSTRACT

A method for implementing community federation is disclosed, including: establishing community federation containing information of a plurality of social networks (SN) of a user on a device, and configuring a processing policy of the community federation; and after logging on the community federation, the community federation managing a message according to the process policy. An apparatus for implementing community federation is also disclosed. Through the above-mentioned method and apparatus, it guarantees that the content data obtain sufficient sharing in the community federation, eliminates the "garden wall" among the communities, and enables the user personal information, the message content, the friend information, etc., to flow better and faster, and improves the user experience in the service application.

10 Claims, 2 Drawing Sheets

(56) References Cited

U.S. PATENT DOCUMENTS

| | | | |
|---|---|---|---|
| 2008/0066149 A1* | 3/2008 | Lim | G06F 17/3089 726/1 |
| 2009/0037973 A1* | 2/2009 | Gustave | G06F 21/6263 726/1 |
| 2009/0182815 A1* | 7/2009 | Czechowski, III | H04L 67/104 709/206 |
| 2011/0029608 A1 | 2/2011 | Harple et al. | |
| 2011/0106528 A1* | 5/2011 | Maddison | H04L 12/5815 704/9 |
| 2012/0310927 A1* | 12/2012 | Johnson | G06F 17/30864 707/723 |

FOREIGN PATENT DOCUMENTS

| | | |
|---|---|---|
| CN | 101360123 | 5/2011 |
| CN | 1653781 | 6/2011 |
| EP | 2328328 | 6/2011 |

OTHER PUBLICATIONS

Disclosed Anonymously, ip.com Journal Feb. 8, 2011, XP 013142431, All together 5 Pages, "A Method and System for Customizable Social Networking Gateway Using Presence Federation and Virtualization."

\* cited by examiner

METHOD AND APPARATUS FOR REALIZING COMMUNITY FEDERATION

CROSS-REFERENCE TO RELATED APPLICATION

This application is the U.S. national phase of PCT Appln. No. PCT/CN2011/082753 filed Nov. 23, 2011 which claims priority to Chinese Application No. 201110194077.3 filed Jul. 12, 2011, the disclosures of which are incorporated in their entirety by reference herein.

TECHNICAL FIELD

The present invention relates to the field of the mobile community network service, and in particular, to a method and apparatus for implementing community federation.

BACKGROUND OF THE RELATED ART

The social network (SN) is a kind of network address book application based on a plurality of views. The current social network has a relatively strong pertinence, and represents the professional characteristic, that is, the kinds of industry related to the SN of a certain type are very accurate, and as a result, there are a great deal of SNs of different types. It causes that the user needs to register in different SNs, and there is the user personal information in each SN. Because the types of SNs are different, the emphasis of the user personal information is different to some extent, and there is no intercommunication channel among different SNs, that is, there is a "garden wall" among the so-called SNs. The "garden wall" not only blocks the user's personal information, but also blocks the intercommunication of the information and friend list of the user in every SN. The user has to perform handover among a plurality of SNs, so as to continuously send or receive the information, or to communicate with friends in each SN. This way, it increases extra workload invisibly, and causes very great inconvenience. This kind of inconvenience can be accepted by the user just when using on the PC perhaps because of the factors such as screen, keyboard, operation, etc., but for the mobile community network, the user mostly uses the service on the mobile equipment, because the hardware condition of the mobile equipment is relatively simple, so it will be very inconvenient for the user to handover repeatedly among a plurality of SNs. In conclusion, the problem urgent to be solved is to eliminate the "garden wall" among the communities as much as possible and let the user to use the SN service conveniently.

Content of the Invention

On that basis, the main objective of the present invention is to provide a method and apparatus for implementing community federation, so as to eliminate the "garden wall" among the communities and makes the user use the SN service conveniently.

In order to achieve the above-mentioned objective, the technical scheme of the present invention is implemented like this:

the present invention provides a method for implementing community federation, comprising:

establishing a community federation containing information of a plurality of social networks (SN) of a user on a device, and configuring a processing policy of the community federation; and after logging on the community federation, the community federation managing a message according to the processing policy.

Wherein, the device comprises: a terminal of the user or a server at a network side.

Wherein, the information of a plurality of SNs of the user at least comprises: account, password and community address of the user registered in each SN; or at least comprises: account, password, community address and permission of the user registered in each SN.

Wherein, the processing policy comprises: a processing policy for receiving and sending the message, a processing policy for configuring message and a logging policy.

Wherein, the community federation managing the message according to the processing policy, comprising:

when a new message reaches, according to the processing policy for receiving and sending the message in the community federation, sending the message to a window of the current activated SN, or only sending a notification message to notify the user to search in the SN that the new message reaches or sending the notification message to all communities in the community federation;

when the user sends the new message, according to the processing policy for receiving and sending the message in the community federation, sending the new message to a selected SN or all SNs;

when the community federation receives a message to modify SN configuration, according to the processing policy for configuring message in the community federation, modifying relevant configuration of an appointed SN or all SNs in the community federation, wherein, the modifying relevant configuration comprises: deleting the community federation, or deleting or adding an SN in the community federation, or deleting or adding a friend in the SN, or modifying information of the friends in batches, or filtering policies according to configuration of friends or messages; and when the community federation receives a message to modify logging configuration of the community federation, modifying the logging policy in the community federation, and when logging on again, logging on the SN in the community federation according to the modified logging policy.

The present invention also provides an apparatus for implementing community federation, located in a device, and comprising: a policy information storage module and a community federation management module; wherein, the policy information storage module is used to store information of a plurality of social networks (SN) of a user and a configured processing policy; and the community federation management module is configured to manage a message according to the processing policy after logging on the community federation.

Wherein, the device comprises: a terminal of the user or a server at a network side.

Wherein, the information of a plurality of SNs of the user stored by the policy information storage module at least comprises: account, password and community address of the user registered in each SN; or at least comprises: account, password, community address and permission of the user registered in each SN.

Wherein, the processing policy stored by the policy information storage module comprises: a processing policy for receiving and sending the message, a processing policy for configuring message and a logging policy.

Wherein, the community federation manages the message according to the processing policy comprises:

when a new message reaches, according to the processing policy for receiving and sending the message, sending the message to a window of the current activated SN, or only sending a notification message, to notify the user to search in the SN that the new message reaches or sending the message to all communities in the community federation;

when the user sends the new message, according to the processing policy for receiving and sending the message, sending the new message to a selected SN or all SNs;

when receiving a message to modify the SN configuration, according to the processing policy for configuring message, modifying relevant configuration of an appointed SN or all SNs in the community federation, wherein, the modifying relevant configuration comprises: deleting the community federation, or deleting or adding an SN in the community federation, or deleting or adding a friend in the SN, or modifying information of the friends in batches, or filtering policies according to configuration of friends or messages; and when receiving a message to modify logging configuration of the community federation, modifying the logging policy in the community federation, and when logging on again, logging on the SN in the community federation according to the modified logging policy.

The method and apparatus for implementing community federation provided by the present invention establishes community federation containing information of a plurality of social networks (SN) of a user on a device and configures a processing policy of the community federation; and after logging on the community federation, the community federation manages a message according to the processing policy. It guarantees that the content data obtain sufficient sharing in the community federation, eliminates the "garden wall" among the communities, and enables the user personal information, the message content, the friend information, etc., to flow better and faster, and improves the user experience in the service application.

PREFERRED EMBODIMENTS OF THE PRESENT INVENTION

The basic idea of the present invention is: establishing community federation containing information of a plurality of social networks (SN) of a user on a device, and configuring a processing policy of the community federation; and after logging on the community federation, the community federation managing a message according to the processing policy.

The technical scheme of the present invention is described in detail with reference to the accompanying drawings and embodiments hereinafter.

Figure 1:
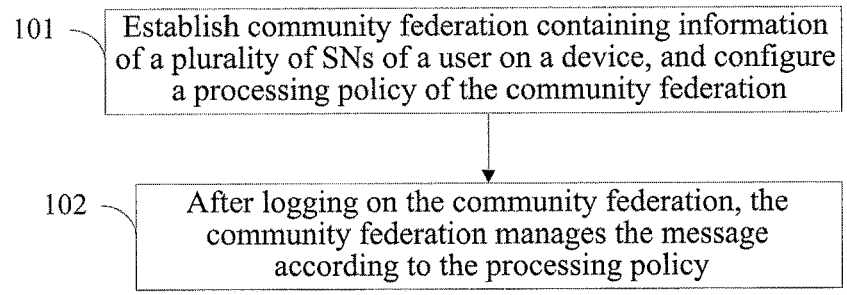
FIG. 1 is a flow chart of a method for implementing community federation of the present invention.
Figure 2:
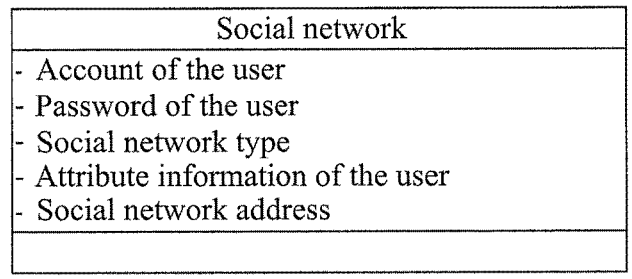
FIG. 2 is a diagram of community information when establishing community federation of the present invention.

FIG. 1 is a flow chart of a method for implementing community federation of the present invention. As shown in FIG. 1, the method includes:

in step 101, establishing community federation containing information of a plurality of social networks (SN) of a user on a device, and configuring a processing policy of the community federation;

specifically, the device includes: a terminal of the user or a server at a network side. The information of a plurality of SNs of the user at least includes: account, password and community address of the user registered in each SN, and also further can include the identification information, such as permission, etc. FIG. 2 is a diagram of community information when establishing community federation of the present invention. As shown in FIG. 2, the UserID and UserPWD represent the account and password of the user, the NetType represents the community network type, the Userprofile represents the attribute information of the user of the located community network, and the NetAddr represents the community network address. The processing policy includes: a processing policy for receiving and sending the message, a processing policy for configuring message and a logging policy.

In step 102, after logging on the community federation, the community federation manages the message according to the processing policy.

Specifically, the information used by logging on the community federation can be set again by the user, and also can adopt the logging information of one SN in a plurality of SNs. In the process of logging, it also needs to depend on the logging strategy. The community federation manages the message according to the processing policy, including:

when there is a new message reaches the SN in the community federation, according to the process strategy for receiving and sending the message in the community federation, sending the message to a window of the current activated SN and promoting the user that there is a new message reaching, or only sending a notification message to notify the user to search in the SN that the new message reaches or sending the notification message to all communities in the community federation;

wherein, the new message reaching the SN in the community federation can be from a certain SN in the community federation, and can also be a message out of the community federation. All SNs sent to the community federation, for example: one SN receives a new comment message, the community federation can send the comment message to all SNs in the community federation, and shares with the friend in each SN.

When the user sends the new message, according to the processing policy for receiving and sending the message in the community federation, the new message is sent to a selected SN or all SNs;

when the community federation receives a message to modify the SN configuration, according to the processing policy for configuring message in the community federation, relevant configuration of an appointed SN or all SNs in the community federation is modified;

wherein, the modifying relevant configuration includes: deleting the community federation, or deleting or adding an SN in the community federation, or deleting or adding a friend in the SN, or modifying information of the friends in batches, or filtering policies according to the setting of friends or messages, etc.

When the community federation receives a message to modify logging configuration of the community federation, the logging policy in the community federation is modified, and when logging on again, the SN in the community federation is logged on according to the modified logging policy.

Figure 3:
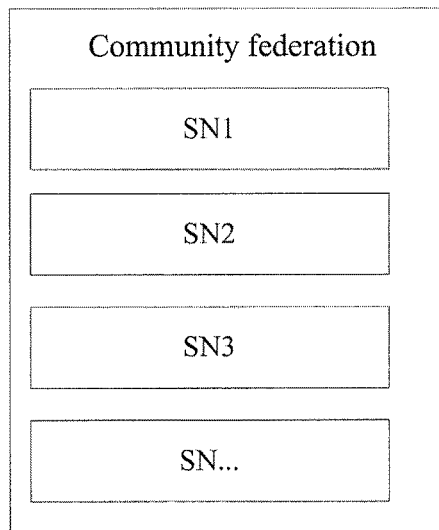
FIG. 3 is a composition diagram of community federation of the present invention.
Figure 4:
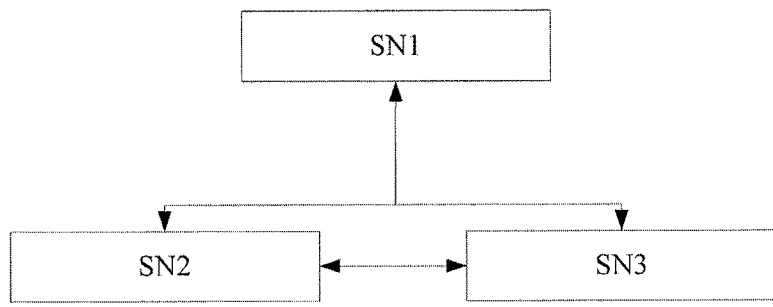
FIG. 4 is a diagram of the connection of SNs in a community federation of the present invention.
Figure 5:
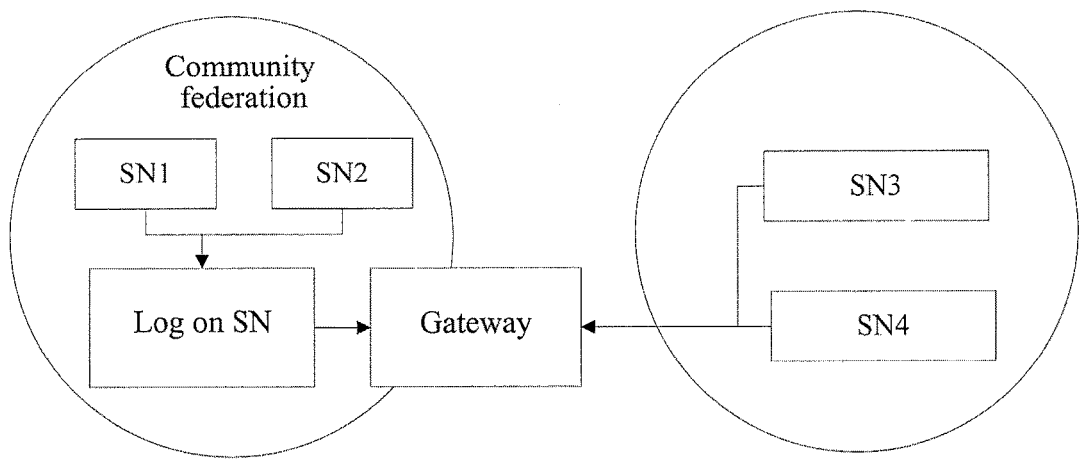
FIG. 5 is a diagram of connection of the community federation with an external SN of the present invention.

FIG. 3 is a composition diagram of community federation of the present invention. As shown in FIG. 3, one community federation is composed of a plurality of SNs of the user. Further, the establishment of the community federation includes the information, such as, the account, the password, the permission and the located community address of the user registered in every community. For the SN in the community federation, logging on one SN equates with logging on each SN in the community federation at the same time. FIG. 4 is a diagram of the connection of the internal SNs in community federation of the present invention, and FIG. 5 is a diagram of community federation connecting with an external SN of the present invention. As shown in FIG. 4 and FIG. 5, some information and operations of the community federation can be controlled through the processing policy of the community federation; when the content of a certain SN of the user changes, it can fast perform the operations, such as, reading, updating and replying, forwarding, commenting, etc., to the message, and can also share the information of the content in the community federation according to the processing policy for receiving and sending the message; likewise, it can perform the configuration on the information of the operation, for example, when it is required to perform searching a certain content, it can search in the community in the community federation at the same time. It also includes managing the configuration of the community federation at the same time, such as updating, deleting the community federation, etc.; updating the community federation includes increasing and reducing the member of the community federation, or modifying information of the member of the located community, etc., and deleting the community federation is to delete the whole community federation. This way, the community federation is established on the terminal equipment or on the server, is managed uniformly in the federation, which guarantees that the content data obtain sufficient sharing in the community federation, eliminates the "garden wall" among the communities, and enables the user personal information, the message content, the friend information, etc., to flow better and faster, and improves the user experience in the service application.

Figure 6:
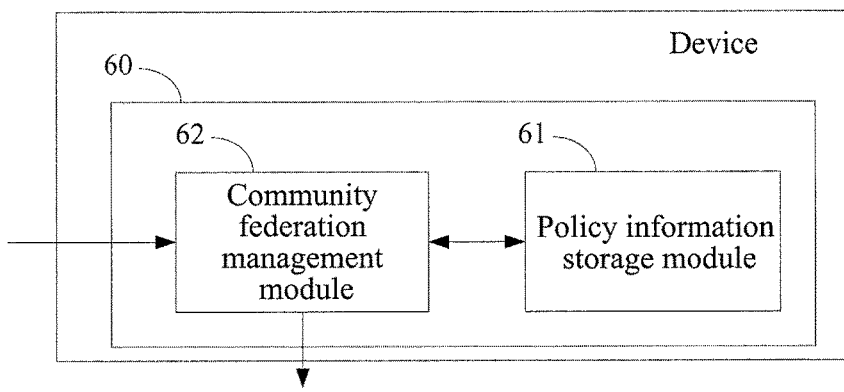
FIG. 6 is a structure diagram of an apparatus for implementing community federation of the present invention.

FIG. 6 is a structure diagram of an apparatus for implementing community federation of the present invention. As shown in FIG. 6, the community federation apparatus 60 locates in the device. The community federation apparatus 60 includes a strategy information storage module 61 and a community federation management module 62; wherein, the policy information storage module 61 is used to store information of a plurality of social networks (SN) of a user and a configured processing policy;

specifically, the device includes: a terminal of the user or a server at a network side. The information of a plurality of SNs of the user at least includes: account, password and community address of the user registered in each community; and further can alternatively include: the identification information such as the permission. The processing policy includes: a processing policy for receiving and sending the message, a processing policy for configuring message and a logging policy.

The community federation management module 62 is used to manage a message according to the processing policy after logging on the community federation.

Specifically, the information used by logging on the community federation can be set again by the user, and can also adopt the logging information of one SN in a plurality of SNs. In the process of logging, it also needs to depend on the logging policy. The community federation management module 62 manages the message according to the processing policy, including:

when a new message reaches, according to the processing policy for receiving and sending the message, sending the message to a window of the current activated SN and prompting the user that a new message reaches, or only sending a notification message, to notify the user to search in the SN that the new message reaches or sending to all communities in the community federation;

wherein, the reached new message can be from a certain SN in the community federation, and can also be the message out of the community federation. All SNs sent to the community federation, for example: one SN receives new comment message, the community federation can send the comment message to all SNs in the community federation, and shares with the friends in each SN.

When the user sends the new message, according to the processing policy for receiving and sending the message, the new message is sent to a selected SN or all SNs;

when receiving a message to modify the SN configuration, according to the processing policy for configuring message, relevant configuration of an appointed SN or all SNs in the community federation is modified, wherein, the modifying relevant configuration comprises: deleting the community federation, or deleting or adding an SN in the community federation, or deleting or adding a friend in the SN, or modifying information of the friends in batches, or filtering policies according to the configuration of friends or messages, etc.

When receiving a message to modify logging configuration of the community federation, the logging policy in the community federation is modified, and when logging on again, the SN in the community federation is logged on according to the modified logging policy.

The above description is only the preferred embodiments of the present invention and is not intended to limit the protection scope of the present invention.

What is claimed is:

1. A method for implementing community federation of social networks in which social networking services are interactive Web 2.0 Internet-based applications, comprising:
    establishing a community federation of a user on a device, the community federation including a plurality of social networks (SNs) which are multiple views based network address book applications, and the community federation containing accounts and passwords of said user registered in the plurality of SNs and social network addresses of the plurality of SNs; and configuring a plurality of processing policies of the community federation; and
    for the SNs in the community federation, logging on one SN equating with logging on the plurality of SNs in the community federation at the same time, and after logging on the community federation, the community federation managing a message according to the plurality of processing policies;
    wherein the plurality of processing policies is used on the device and include: a processing policy for receiving and sending the message, a processing policy for configuring message and a logging policy;
    wherein the community federation managing a message according to the plurality of processing policies comprises:

when receiving a first new message sent to one SN in the community federation from an external SN on another device or an SN in the community federation; according to the processing policy for receiving and sending the message, sending the first new message to a window of a current activated SN which is not said one SN in the community federation and promoting the user that there is a new message reaching, or only sending a notification message in the community federation to notify the user to search the first new message in the said one SN, or sending the first new message to windows of all SNs in the community federation to notify the user to search the first new message in the said one SN to perform operations, such as reading, updating and replying, forwarding, commenting, to the first new message when a certain SN of the user changes, and eliminating a garden wall among the different SNs;

when the user sends a second new message according to the processing policy for receiving and sending the message, sending by the user the second new message from one SN to a selected SN or all SNs in the community federation.

2. The method according to claim 1, wherein, the device comprises: a terminal of the user or a server at a network side.

3. The method according to claim 1, wherein, the information of a plurality of SNs of the user at least comprises: account, password and community address of the user registered in each SN; or at least comprises: account, password, community address and permission of the user registered in each SN.

4. An apparatus for implementing community federation of social networks, located in a device in a social network in which social networking services are interactive Web 2.0 Internet-based applications, and comprising:

a community federation of a user, the community federation including a plurality of social networks (SNs) which are multiple views based network address book applications, and the community federation containing accounts and passwords of said user registered in the plurality of SNs and social network addresses of the plurality of SNs;

wherein the plurality of SNs in the community federation communicate with external SNs on one or more other devices, and wherein the apparatus comprises: a policy information storage module and a community federation management module which are located in any form of non-volatile storage devices; wherein, the policy information storage module is used to store information of the plurality of SNs of the user and a plurality of configured processing policies which is used on the device and includes a processing policy for receiving and sending the message, a processing policy for configuring message and a logging policy; and the community federation management module is configured to manage a message according to the plurality of processing policies after logging on the community federation; wherein for the SNs in the community federation, logging on one SN equating with logging on the plurality of SNs in the community federation at the same time;

wherein the community federation management module is configured to manage the message according to the plurality of processing policies in the following way:

when receiving a first new message sent to one SN in the community federation from an external SN on another device or an SN in the community federation; according to the processing policy for receiving and sending the message, sending the first new message to a window of a current activated SN which is not said one SN in the community federation and promoting the user that there is a new message reaching, or only sending a notification message in the community federation to notify the user to search the first new message in the said one SN, or sending the first new message to windows of all SNs in the community federation to notify the user to search the first new message in the said one SN to perform operations, such as reading, updating and replying, forwarding, commenting, to the first new message when a certain SN of the user changes, and eliminating a garden wall among the different SNs;

when the user sends a second new message according to the processing policy for receiving and sending the message, sending by the user the second new message from one SN to a selected SN or all SNs in the community federation.

5. The apparatus according to claim 4, wherein, the device comprises: a terminal of the user or a server at a network side.

6. The apparatus according to claim 4, wherein, the information of a plurality of SNs of the user stored by the policy information storage module at least comprises: account, password and community address of the user registered in each SN; or at least comprises: account, password, community address and permission of the user registered in each SN.

7. The method according to claim 2, wherein, the information of a plurality of SNs of the user at least comprises: account, password and community address of the user registered in each SN; or at least comprises: account, password, community address and permission of the user registered in each SN.

8. The apparatus according to claim 5, wherein, the information of a plurality of SNs of the user stored by the policy information storage module at least comprises: account, password and community address of the user registered in each SN; or at least comprises: account, password, community address and permission of the user registered in each SN.

9. The method according to claim 1, wherein the community federation managing a message according to the plurality of processing policies further comprises:

when the community federation receives a message to modify SN configuration, according to a the processing policy for configuring message in the community federation, modifying relevant configuration of an appointed SN or all SNs in the community federation, wherein, the modifying relevant configuration comprises: deleting the community federation, or deleting or adding an SN in the community federation, or deleting or adding a friend in the one SN in the community federation, or modifying information of the friends in batches, or filtering policies according to configuration of friends or messages; and when the community federation receives a message to modify logging configuration of the community federation, modifying the logging policy in the community federation, and when the user logging logs on again, logging on the one SN in the community federation according to the modified logging policy.

10. The apparatus according to claim 4, wherein the community federation management module is further configured to manage the message according to the plurality of processing policies in the following way:

when the community federation receives a message to modify SN configuration, according to a the processing policy for configuring message in the community federation, modifying relevant configuration of an appointed SN or all SNs in the community federation, wherein, the modifying relevant configuration comprises: deleting the community federation, or deleting or adding an SN in the community federation, or deleting or adding a friend in the one SN in the community federation, or modifying information of the friends in batches, or filtering policies according to configuration of friends or messages; and when the community federation receives a message to modify logging configuration of the community federation, modifying the logging policy in the community federation, and when the user logging logs on again, logging on the one SN in the community federation according to the modified logging policy.

\* \* \* \* \*